United States Patent [19]

Okada et al.

[11] Patent Number: 4,943,495
[45] Date of Patent: Jul. 24, 1990

[54] FUEL CELL

[75] Inventors: Tatsunori Okada; Masayuki Miyazaki; Toshihide Tanaka; Chiaki Hatoh; Masahiro Mukai, all of Amagasaki, Japan

[73] Assignee: Mitsubishi Denki Kabushiki Kaisha, Japan

[21] Appl. No.: 379,227

[22] Filed: Jul. 13, 1989

[30] Foreign Application Priority Data

Sep. 9, 1988 [JP] Japan ................................. 63-226948

[51] Int. Cl.$^5$ ............................................. H01M 8/02
[52] U.S. Cl. ........................................ 429/35; 429/34; 429/39
[58] Field of Search ..................................... 429/34–39

[56] References Cited

U.S. PATENT DOCUMENTS 3,575,719  4/1971  Nelson et al. ...................... 429/35 X
4,159,367  6/1979  Berchielli et al. ...................... 429/38
4,743,518  5/1988  Romanowski ...................... 429/35 X Primary Examiner—Stephen J. Kalafut
Attorney, Agent, or Firm—Leydig, Voit & Mayer

[57] ABSTRACT

A fuel cell in which the sealed portions formed at the peripheral edges of gas flow passages of a gas separating plate are turned so that they have a U-shaped cross section in the direction of the lamination so as to provide for elasticity. A filling member is filled in the interior of the sealed portions. This gas separating plate is used to respectively form gas flow passages through which different gas fluids are caused to flow so that they are electrochemically reacted in a pair of electrode reacting portions disposed with an electrolyte layer being interposed therebetween. In consequence, the sealed portions provided at the peripheral edges of the gas flow passages deform in accordance with the creep caused in the electrode reacting portions. This enables a balanced, adequate bearing pressure to be kept applied to the electrode reacting portions and the sealed portions, thereby enabling the fuel cell to be operated in an excellent gas sealed state for a long time.

8 Claims, 4 Drawing Sheets

FUEL CELL

BACKGROUND OF THE INVENTION

1. FIELD OF THE INVENTION

The present invention relates to a fuel cell, and more particularly, the present invention concerns a fuel cell which is improved in the gas sealing characteristics of the periphery of a flow passage formed by a gas separating plate.

2. DESCRIPTION OF THE RELATED ART

FIG. 1 is a cross-sectional view of a conventional laminated type fuel cell which employs an inner manifold process. Such a fuel cell is disclosed in the specification of, for example, Japanese Patent Application Laid-Open No. 62-208559. This fuel cell is comprised of an electrolyte layer 10 and a pair of electrode reacting portions 11 and 12 disposed in opposed relation with the electrolyte layer 10 interposed therebetween. The electrode reacting portion 11 is an oxidizing agent electrode reacting portion where oxidant gas A mainly composed of air and carbon dioxide is electrochemically reacted with the electrolyte, and the electrode reacting portion 12 is a fuel electrode reacting portion 12 in which electrochemical reaction of a fuel gas B mainly composed of hydrogen, carbon monoxide and hydrocarbon occurs. The electrode reacting portions 11 and 12 respectively incorporate corrugated plates that form gas flow passages 11a and 12a. The gas fluids A and B are separated from each other by a gas separating plate 13, which is called a bipolar or separator plate. A fuel cell is formed by laminating the electrolyte layer 10, the gas separating plate 13 and so on successively.

FIG. 2 is an exploded perspective view of the gas separating plate 13 that forms gas flowing passages in the laminated type fuel cell shown in FIG. 1. Since this fuel cell is of a parallel flow type in which the gas fluids A and B flow parallel to each other, manifolds 16a and 17a for supplying the gas fluids A and B are alternately provided on one side of the periphery of the gas separating plate 13, while exhaust manifold 16b and 17b are alternately disposed on the side opposite to that on which the supply manifolds 16a and 17a are provided. On both sides of the periphery of the separating plate 13, the supply manifolds 16a and 17a and the exhaust manifolds 16b and 17b are respectively separated from each other by distance pieces 14 and 15. Further, the irregularities of the corrugated plates of the electrode reacting portions 11 and 12 respectively form the gas flow passages 11a and 12a, as stated above.

In the thus-arranged fuel cell, the laminated layers are pressurized to compress the layers of the lamination so that an appropriate bearing pressure can be applied to the laminated surfaces. This allows the contact portions of the laminated members to be sealed, thus preventing gas leakage.

Next, the operation of the conventional laminated type fuel cell will be described below. The oxidant gas A which is supplied from below as viewed in FIGS. 1 and 2 passes through the oxidant gas supply manifolds 16a that are opened in the distance pieces 15 disposed below the gas separating plates 13, and flows into the gas flow passages 11a of the oxidant electrode reacting portions 11. The oxidant gas A that has flown through the gas flow passages 11a is exhausted to the outside of the cell through the exhaust manifolds 16b. In contrast, the fuel gas B which is supplied from below flows into the upper portions of the gas separating plates 13 through the supply manifolds 17a which are the small holes formed in the distance pieces 15 disposed below the gas separating plates 13. The fuel gas B is then supplied into the gas flow passages 12a of the fuel electrode reacting portions 12 through the fuel gas supply manifolds 17a opened in the distance pieces 14 disposed above the gas separating plates 13.

In the above-described laminated type fuel cell, improvement in the gas sealing and balancing of the bearing pressure are essential to the prevention of gas leakage and reduction in the performance of the cell. However, the electrode reacting portions, the gas supply manifolds and the gas sealed portions provided around the gas supply manifolds show different creep (plastic deformation) characteristics with the passage of time, and the creep or deformation caused in the electrode reacting portions therefore generates unbalance in the bearing pressure or gas leakage. In relation to this, Japanese patent Application Laid-Open No. 62-188177 filed by the applicants of this invention discloses a fuel cell of the type in which gas fluid is supplied using outer manifolds provided at the side of the fuel cell and in which gas separating plates are turned at the sides of the flow passages so as to make them flexible.

In a laminated type fuel cell in which gas fluid is supplied using the inner manifolds, the walls of the inner manifolds are in direct contact with the external atmosphere, and the sealed portions of the manifolds are in contact with the other gas flow passages, thus necessitating more reliable sealing. However, in such a type of conventional fuel cell, it is impossible to make sure that the sealed portions deform uniformly in accordance with the deformation of the electrode reacting portions caused by the creep, causing mixture and reaction of the fuel gas with the oxidant gas in a fuel cell.

SUMMARY OF THE INVENTION

In view of the above-described problems of the related art, an object of the present invention is to provide a fuel cell in which a sealed portion is made to uniformly deform in accordance with the deformation of electrode reacting portions caused by creep thereof so as to improve the gas sealing characteristics of the fuel cell.

To this end, the present invention provides a fuel cell comprising: an electrolyte layer; a pair of electrode reacting portions disposed on both sides of the electrolyte layer; and a pair of gas separating plates laminated on the outer sides of the electrode reacting portions, respectively, the gas separating plates are provided so as to form gas flow passages through which different types of gas fluid are caused to flow so that they can be electrochemically reacted in the respective electrode reacting portions; the fuel cell is fabricated by laminating the electrolyte layer, the electrode reacting portions and the gas separating plates, sealed portions of each of the gas separating plates which are provided on the periphery of the gas flow passage having a U-shaped cross section with stems of the V extending substantially parallel to the layers of the lamination so that they may flex a filling member filled interior of the peripheral sealed portions.

DETAILED DESCRIPTION OF THE PREFERRED EMBODIMENT

Figure 1:
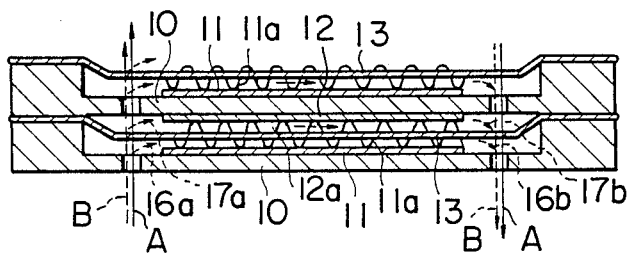
FIG. 1 is a cross-sectional view of a conventional laminated type fuel cell which employs an inner manifolds.
Figure 2:
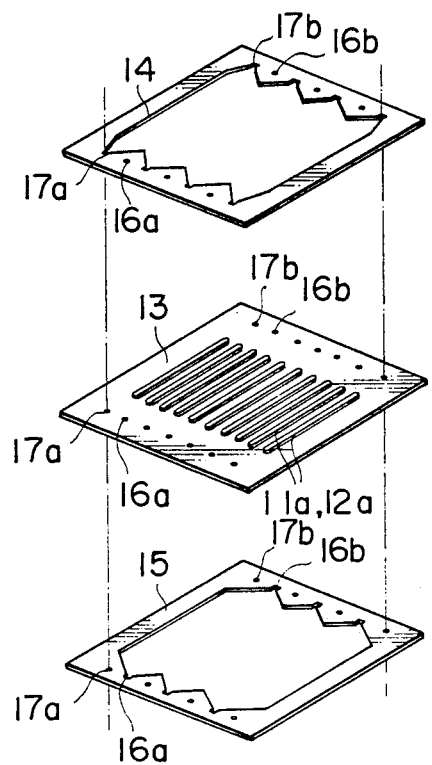
FIG. 2 is an exploded perspective view of a gas separating plate that forms gas flow passages for one stage in the laminated type fuel cell of FIG. 1.
Figure 3:
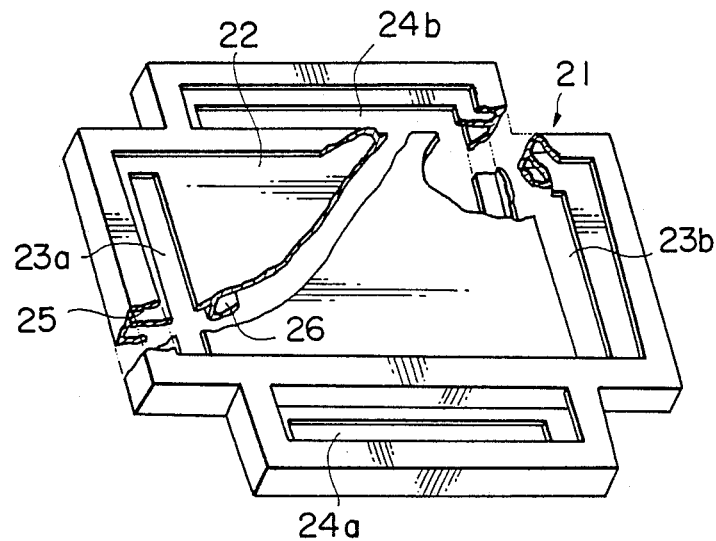
FIG. 3 is a perspective view of a gas separating plate of a fuel cell showing an embodiment of the present invention.

Referring first to FIG. 3 which is a perspective view of a gas separating plate 21 used in a fuel cell according to the present invention, a gas flow passage through which a fuel gas is caused to flow is formed along an upper surface 22 of the gas separating plate 21. Along the under surface of the gas separating plate 21 is formed a gas flow passage through which an oxidant gas is caused to flow. This embodiment is of a type in which the fuel gas and the oxidant gas are circulated in the directions perpendicular to each other. Consequently, a pair of fuel gas manifolds 23b and 23b that respectively supply and discharge the fuel gas are provided at the two sides of the gas separating plate 21, and a pair of oxidant gas manifolds 24a and 24b that respectively supply and discharge the oxidant gas are provided at the remaining two sides of the gas separating plate 21. On the peripheral edges of the gas flow passages are formed sealed portions 25 and 26. The sealed portion 25 is an outer sealed portion which prevents gas from leaking to the outside of the cell, and the sealed portion 26 is an inner sealed portion that prevents mixture of the two types of gas within the cell. Both of the sealed portions 25 and 26 are soft rail having a U-shaped which is fixed to the gas separating plate by means of welding or brazing. The sealed portions are formed such that they exhibit a U-shaped cross section so as to make them elastic.

Figure 4:
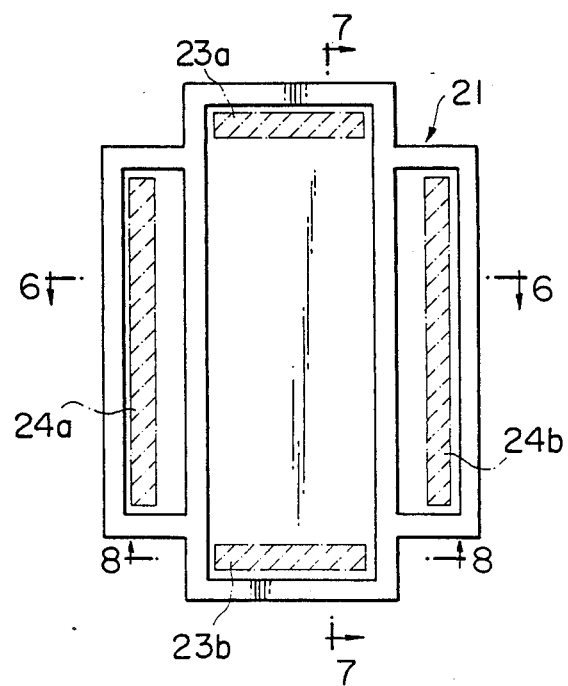
FIGS. 4 and 5 are respectively plan and bottom views of the gas separating plate of FIG. 3.
Figure 5:
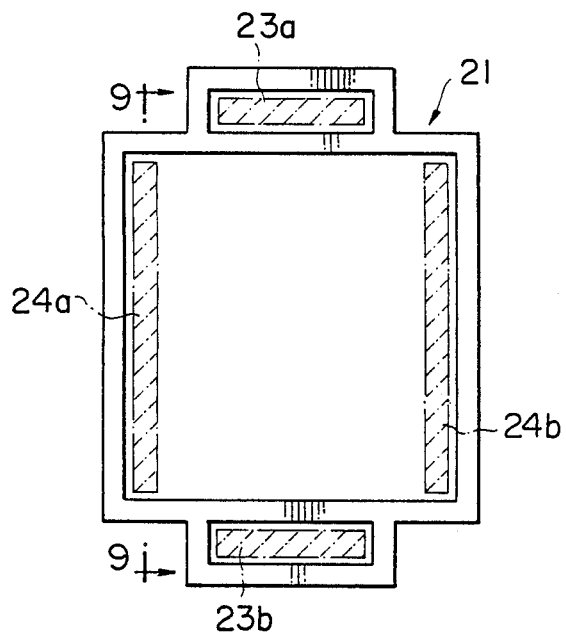
Figure 6:
FIGS. 6 to 9 are respectively sections taken along the lines VI—VI, VII—VII and IX—IX of FIGS. 4 and 5.
Figure 7:
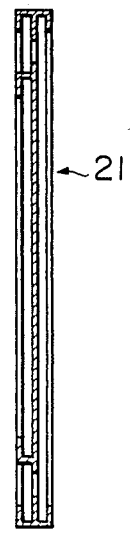
Figure 8:
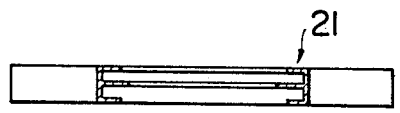
Figure 9:
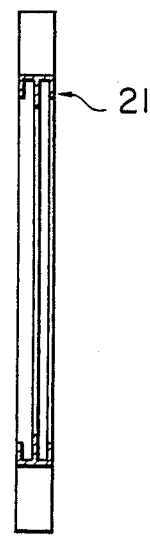

FIGS. 4 and 5 are respectively plan and bottom views of the gas separating plate 21 shown in FIG. 3, and FIGS. 6 to 9 are sections taken along the respective lines VI—VI, VII—VII, VIII—VIII and IX—IX of FIGS. 4 and 5.

Figure 10:
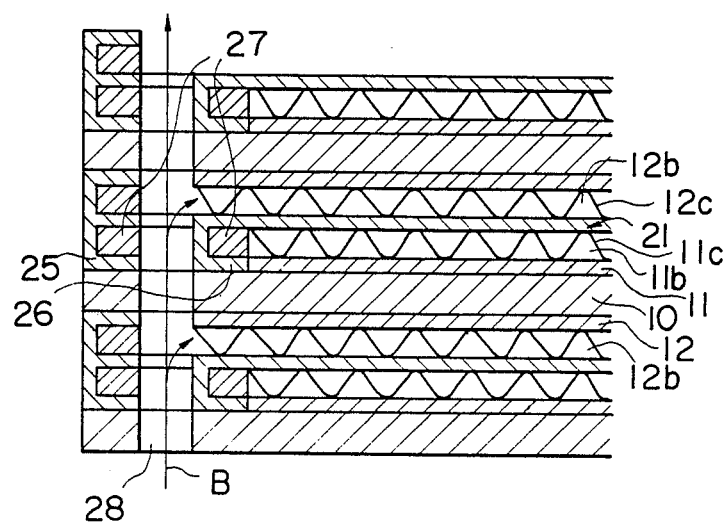
FIG. 10 is a cross-sectional view of a laminated type fuel cell that employs the gas separating plate of FIG. 3.

FIG. 10 is a cross-sectional view of a fuel cell in which the gas separating plate 21, the gas flow passages 11b and 12b formed by the corrugated plates, the electrode reacting portions 11 and 12 are laminated on top of each other with an electrolyte layer 10 interposed between the electrode reacting portions 11 and 12. As shown in FIG. 10, a filling member 27 is filled in the U-shaped sealed portions formed on the peripheral edges of the gas flow passages 11b and 12b. The filling member 27 is made of a material having substantially the same creep (plastic deformation) characteristics with the passage of time in the laminated direction as those of the material used to form the electrode reacting portions 11 and 12, e.g., the filling member 27 may be made of a laminate which is used to form the electrode reacting portions 11 and 12 and which is formed by laminating the material that forms the electrodes (not shown) and the one that forms corrugated plates 11c and 12c. The creep is largely dependent on the electrodes and the corrugated plates.

In the fuel cell arranged in the manner described above, the fuel gas B is supplied from the fuel gas supply manifold 28 to the gas flow passages 12b of the individual electrode reacting portions, as shown in FIG. 10. At this time, the fuel gas B is prevented from leaking to the outside of the cell by the presence of the outer sealed portions 25 of the fuel gas supply manifold 28, and is prevented from flowing into the oxidant gas flow passages 11b by the inner sealed portions 26. Sealing of the oxidant gas is performed in the same manner, description thereof being thus omitted.

Next, creep caused with the passage of time will be described. At the start of the operation, a bearing pressure of, for example, about 3 kg/cm$^2$ is applied to compress the layers of the lamination. During the operation that extends over long hours, the electrodes and so on become deformed due to the creep caused in them. However, the sealed portions have a U-shaped form and are therefore elastic, and a filling member 27 having substantially the same creep characteristics of those of the electrode reacting portions is filled in the recesses of the sealed portions. In consequence, the sealed portions formed at the peripheral edges of the gas flow passages deform in accordance with the creep occurring in the electrode reacting portions. Furthermore, they deform in the same degree as that at which the electrode reacting portions deform due to the adequate elasticity thereof, allowing an adequate and balanced bearing pressure to be kept applied to the electrode reacting portions and the sealed portions. This enables the fuel cell to be operated in an excellent gas sealed state for a long time.

The above-described embodiment is a fuel cell of the type in which both of the fuel gas and the oxidant gas are supplied using inner manifolds. However, the same effect will also be obtained in the case of a hybrid fuel cell in which either of the fuel gas or the oxidant gas is supplied using the inner manifold.

Furthermore, the above-described embodiment is a fuel cell in which the fuel gas and the oxidant gas are caused to flow in the directions perpendicular to each other. However, the same sealed portions may be formed at the peripheral edges of the gas flow passages in a parallel-flow type fuel cell.

Furthermore, the effect of the above-described sealed portions is remarkable in the case of a fuel cell that employs an inner manifold. However, the present invention can also be applied to a fuel cell which employs an outer manifold.

What is claimed is:

1. A fuel cell comprising:
    an electrolyte layer;
    a pair of electrode reacting portions disposed on both sides of said electrolyte layer; and
    a pair of gas separating plates laminated on the outer sides of said electrode reacting portions, respectively, said gas separating plates are provided so as to form gas flow passages through which different types of gas fluid are caused to flow so that they can be electrochemically reacted in said respective electrode reacting portions;
    said fuel cell is fabricated by laminating said electrolyte layer, said electrode reacting portions and said gas separating plates;
    sealed portions of each of said gas separating plates which are provided on the periphery of said gas flow passage having a U-shaped cross section with stems of the U extending substantially parallel to the layers of the lamination so that they may flex, and a filling member filled interior of said peripheral sealed portions.

2. A fuel cell according to claim 1 wherein said filling member is a member which has substantially the same plastic deformation characteristics as those of said electrode reacting portions with the passage of time.

3. A fuel cell according to claim 1 wherein said gas flow passage each incorporates a corrugated plate.

4. A fuel cell according to claim 1 wherein said different types of gas fluid are a fuel gas fluid and an oxidant gas fluid.

5. A fuel cell according to claim 4 wherein said gas flow passage for said fuel gas fluid and said gas flow passage for said oxidant gas fluid are formed perpendicular to each other.

6. A fuel cell according to claim 4 wherein said gas flow passage for said fuel gas fluid and said gas flow passage for said oxidant gas fluid are formed parallel to each other.

7. A fuel cell according to claim 1 wherein said gas separating plate is provided with inner gas manifolds.

8. A fuel cell according to claim 7 wherein said gas manifold of at least either of said fuel gas or said oxidant gas is an inner gas manifold.

* * * * *